2,962,400
METHOD OF PRODUCING THORIATED METALLIC TUNGSTEN BODIES

Pál Tury and Tivadar Millner, Budapest, Hungary, assignors to Egyesult Izzolampa es Villamossagi Reszvenytarsasag, a firm No Drawing. Filed May 14, 1957, Ser. No. 659,456

Claims priority, application Hungary May 19, 1956

7 Claims. (Cl. 148—11.5)

This invention relates to the production of thoriated metallic tungsten bodies, especially tungsten wires, the expression "thoriated" designating, in the present specification and claims, metallic bodies containing thorium dioxide ($ThO_2$) in quantities ranging between some tenths of percents and some percents, for example, between about 0.2 and 4% by weight.

Such thoriated metallic tungsten bodies are used, as well known, for various purposes, such as the manufacture of incandescent cathodes for electric discharge tubes, of heat resisting springs and the like. It is also known to produce such thoriated tungsten bodies by means of the method used for producing tungsten bodies, especially wires, this method comprising reduction of tungsten compounds by means of heating in an atmosphere containing hydrogen, pressing the metallic tungsten powder thus obtained, eventually after the admixture of additives, to bars, sintering said bars, swaging said sintered bars and finally, if wires are to be produced, drawing them to wires, all of these steps being performed at fairly high temperatures well known to those skilled in this art.

It is also known that during the mechanical working, i.e. swaging and wire drawing, of such sintered bars considerable difficulties are caused by the nature of the sintered tungsten bars, resulting in the production of faulty products. Breakage of the bars often occurs during the swaging operation, which as well known, consists of a series of swagings performed in the special rotating swaging machine in several successive swagings with intermediate heating operations. Diagonal cracks of various widths often appear on the surface of the swaged bars, while the surface of the drawn wires is uneven and feels as if it were covered with bristles and even splitting often occurs in case of thin wires. These defects are, as a rule, not very considerable in case of bars containing no thorium dioxide, but increase rapidly with the thorium dioxide content of the bars, and especially in case of bodies containing thorium dioxide in excess of 1%, are apt to assume very troublesome extents often seriously hampering the manufacturing process by excessive production of faulty products not adapted for further working or practical use.

Manufacturing experience has also shown, that the aforesaid difficulties of working increase strongly if the tungsten powder used as initial material contains, besides thorium dioxide, also carbon, for example carbon black, graphite, tungsten carbides, or the like. The workability of the tungsten bodies is impaired by these non-metallic substances already in consequence of the fact that they effect a substantial decrease of the metallic coherence of the metal particles in the tungsten body, owing to their considerable volume, as an example of which it may be stated, that 2% by weight of $ThO_2$ represent 4% by volume of the thoriated tungsten body. In addition to this, the embedded particles of thorium dioxide, as well as the particles of tungsten carbide formed of the carbon cause a diminution of the ductility of the tungsten body owing to their not being ductile. It was however, quite independently of these explanations, a general opinion based on extensive manufacturing experience of those skilled in this art that the impurity of the tungsten body exercising the most detrimental effect on its workability is its carbon content, owing to which the tungsten bodies are very often liable to be brittle and are liable to breakage. On the basis of this general opinion it appeared obvious that the carbon content would be increasedly noxious to the workability of tungsten bodies containing thorium dioxide, which in itself already impairs the workability of the thiorated tungsten bodies, as already set forth above.

It is an object of the invention to provide a method for producing thiorated metallic tungsten bodies, especially tungsten wires, which is adapted to obviate the difficulties of working encountered up to now by increasing the workability of said thoriated metallic tungsten bodies, i.e. rendering them less liable to the defects detailed above as occurring during the course of their manufacture.

It is further object of the invention to provide a method for checking, during the course of manufacturing thoriated tungsten bodies, the extent of the special treatment to which they have been subjected according to our invention, in order of ascertaining if it has been carried out so as to give optimum results.

Our invention is based on our having discovered, on the basis of our experimental research work directed to the ascertaining of the optimal conditions of producing thoriated tungsten bodies, that the general opinion referred to above, according to which the carbon content is increasedly noxious for the workability of thoriated tungsten bodies, is incorrect. We have, in the course of our experiments, ascertained beyond any doubt that the workability of thoriated tungsten bodies can be increased to an extraordinary and astonishing extent, if carbon is introduced into the tungsten body by contacting the surface of the sintered tungsten body, such as a bar, in the course of its manufacturing process with carbon at a temperature of at least 1300° centigrade. We have ascertained that at temperatures ranging between about 1300 and 1700° centigrade the sintered tungsten body is able to take up carbon, and is substantially improved as regards to its workability by the carbon introduced into it by such treatment.

Accordingly, our invention broadly consists, in the method of producing thoriated metallic tungsten bodies from tungsten powder containing thorium dioxide by pressing, sintering and swaging, of the step of introducing carbon into said tungsten body by contacting the surface of the sintered tungsten body with carbon at a temperature of at least 1300° centigrade.

The carbon with which the sintered tungsten bar has to be contacted at elevated temperatures according to our invention may be solid, and consist, for example, of a graphite tube in which the tungsten bar is subjected to heating while protected against oxidation by an atmosphere of protective gas, preferably streaming through said graphite tube, and consisting of hydrogen. It is however, preferable to contact the surface of the sintered tungsten body with carbon or gaseous state, i.e. with carbon-containing gas, the carbon content of which may preferably be present as the carbon atom of carbon monoxide and of hydrocarbons forming constituents of the gas mixture with which the tungsten body is being contacted. As such carbon-containing gas mixtures a great variety of gas mixtures may be used, but we have found that lighting gas, such as is used for feeding the burners of the automatic machines used for manufacturing incandescent electric lamps in the factories, is very suitable and easily available. This lighting gas may possess the usual content of carbon monoxide and hydrocarbons, it being only essential that it should contain practically no sulphur, and less nitrogen than producer gas. Accordingly, ordinary municipal lighting gas, freed from sulphur, and eventually also containing admixtures of natural gas, such as methane, propane, butane, or of other gaseous hydrocarbons, may also be conveniently used as carbon-containing gas. We have found it to be very advantageous to combine the use of a carbon-containing gas mixture with that of solid carbon in the shape of graphite, by heating the sintered tungsten bar in a graphite tube through which said carbon-containing gas mixture streams admixed to hydrogen in a quantity ranging between about 1 to 10% by volume of the hydrogen.

It is a very important advantage of the method according to our invention that it may be easily performed during the conventional manufacturing process of thoriated tungsten bodies. For this purpose, it is only necessary either to use a graphite tube instead of the ceramic tubes used up to now as the receptacle in which the sintered tungsten bars are heated, or to use an admixture of carbon-containing gas to the conventional protective gas consisting of hydrogen, and let this carbon-containing gas mixture stream through the tube in which the sintered tungsten body has to be heated in a furnace repeatedly in the course of its usual swaging operation, which consists, as already stated above, of repeated swagings to ever-decreasing diameters with intermediate heatings in a furnace. The temperature of these heatings may be different for each heating, as usual, and be preferably in the range of 1450 to 1600° centigrade. By proceeding in such a manner, and preferably using a graphite tube through which a stream of carbon-containing gas mixture streams during said heating, the new method may easily be incorporated into the usual manufacturing process of thoriated or unthoriated tungsten bodies, it being however, advantageus to use the carbon-containing gas already on occasion of the heating effected before the swaging operation.

The quantity of carbon taken up by the sintered tungsten body during its contacting with carbon mainly depends on the temperature and duration of the heating of the tungsten body while contacting with carbon, and on the carbon content of the carbon-containing gas and its speed of streaming, and/or the surface of the sintered body contacting with the graphite tube. By suitable adjusting of these factors its is therefore easily possible to obtain such an uptake of carbon by the tungsten body, which will ensure the desired case of working, i.e. obviation of the difficulties detailed above.

We have discovered that the most preferable quantity of carbon taken up by the thoriated tungsten body may be easily and conveniently checked during the manufacturing process by examination of the surface of the bar immediately after its usual heating to high temperatures effected in order to obtain annealing of the bar which tends to become brittle owing to the substantial diminution of its diameter effected by the swaging. This heating is, as well known, usually effected to temperatures surpassing 2000° centigrade in an atmosphere of hydrogen, after the diminution of the diameter of the bar by 30% effected by the swaging.

We have found that the most convenient quantity of carbon taken up by the thoriated tungsten bar is that which is indicated by the phenomenon of tiny globules of metallic thorium just beginning to appear on the surface of the bar after its said heating in hydrogen to a temperature surpassing 2000° centigrade. These tiny globules of metallic thorium are easily perceptible with the naked eye, i.e. without using a magnifying glass, and are most probably due to the reducing effect of the carbon content of the thoriated tungsten bar, which effect at these high temperatures is strong enough to produce said tiny globules appearing sporadically on the surface of the thoriated tungsten body.

It is easy to adjust, by means of some preliminary experiments, the carbon content of the gas contacting with the thoriated tungsten body during its heating to such a value, that the usual temperatures and durations of the intermediate heatings of the bar and the usual speeds of streaming of the protective gas may remain unchanged, and the thoriated tungsten body nevertheless takes up the required optimum quantity of carbon. In this connection it has to be remarked that for this purpose, the carbon content of the gas mixture may vary according to the nature and thorium dioxide content of the thoriated tungsten body and to the tube, i.e. ceramic or carbon tube, in which said body is heated while contacting with said carbon-containing gas.

Adjusting the carbon content to the value indicated by the beginning of the appearing of the metallic thorium globules is however not imperative, as the workability of the thoriated tungsten body is very substantially improved by a carbon content of about one-half of this value, and yet good enough for usual manufacturing practice when amounting to the double of this value, i.e. may range within fairly wide limits. It is, however, often preferable to adjust the carbon content of the thoriated tungsten body only just to the value indicated by the beginning of the appearance of the metallic thorium globules, for example for the purpose of avoiding losses of the thorium dioxide contained in the thoriated tungsten body, i.e. ensuring its presence in undiminished quantity and finely divided condition. This is desirable for example, in the case of manufacturing thoriated tungsten wires to be used as incandescent cathodes in electric discharge tubes, in which wires the loss of thorium caused by the appearance of metallic thorium globules in a substantial quantity is not immaterial and has therefore to be avoided as far as possible.

The method according to our invention and its easy incorporation into the conventional manufacturing process of tungsten bodies manufactured of metallic tungsten powder with or without the admixture of additives, such as thorium dioxide, will be described hereinafter in detail in an example, it being however, understood that the invention is not limited to this example.

The metallic tungsten powder used as initial material is produced in any suitable known manner, and after an admixture of 2% by weight of finely divided powdered thorium dioxide, worked up to sintered thoriated tungsten bars by pressing and sintering effected in the usual known manner. Ten such sintered bars are singly subjected to the treatment hereinafter described, the dimensions of the bars being 6.5 x 6.5 x 220 millimetres. Each bar is placed in a graphite tube of circular cross-section, the internal and external diameters of these tubes being about 20 and 30 millimetres, respectively. These graphite tubes containing the sintered bars are placed into the conventional electric furnace provided with a scavenging of hydrogen, and a stream of pure hydrogen gas is passed through each tube with a speed of 200 litres per hour. The graphite tubes are pushed into this furnace in the usual manner until they reach a section of the furnace in which the temperature is 1500° centigrade. Beginning from this time, lighting gas freed from sulphur and having a content of carbon monoxide ranging between about 8 and 12% and a gaseous hydrocarbon content ranging between about 25 and 35%, the greatest part of which consists of methane, is admixed to the hydrogen streaming through the graphite tubes in a quantity of about 7 litres per hour for each tube. The bars are now heated in this stream of gas containing 3.5% by volume of lighting gas to the temperature necessary for their transferring to the swaging machine, i.e. to about 1500 centigrade. Swaging is effected in the conventional manner to ever-decreasing diameters, with the usual intermediate heatings, which, however, are performed in said stream of hydrogen containing 3.5% of lighting gas.

After having obtained a cylindrical bar of a diameter of about 4.3 mm., this bar is annealed in the apparatus used for sintering tungsten bars, in an atmosphere of pure hydrogen, by being heated for 3 minutes to a temperature amounting to about 2500° centigrade by means of an electric current of a value amounting to 80% of the fusing amperage of the bar. After the bar has cooled, tiny bright metallic globules of thorium can be detected on its surface in sporadic irregular distribution which globules lose their brightness after having been exposed for some time to the atmospheric air.

The thoriated tungsten bars thus annealed are hereafter subjected to the usual further swaging with intermediate heatings effected in ceramic tubes in a stream of hydrogen containing no carbon-containing gas. After having swaged the bars to a diameter of 0.5 mm. they are drawn through the usual dies to wires of the desired size, for example a diameter of 0.2 mm., in the usual manner. The thorium dioxide content of the finished wires ranges between 1.7 and 1.9% by weight. By using other initial materials, wires with contents of thorium dioxide ranging between about 0.2 to 3% by weight can be produced.

By subjecting ten bars to the treatment specified above, and ten other bars of the same batch and therefore identical with the others to exactly the same treatment, but with their heating effected in ceramic tubes in a stream of protective gas containing no admixture of carbon-containing gas, it can be ascertained that faults occurring during the working on the bars treated according to the invention amount only to a small fraction of those occurring on the bars produced in the manner known up to now.

We have ascertained that the thoriated tungsten bodies produced according to our invention offer, owing to their improved mechanical and other qualities, substantial advantages also when being shaped to their final shape, for example to incandescent cathodes and may easily be identified as having been manufactured according to our invention by their carbon content depending in each individual case on the thorium dioxide content as well as on the purpose for which the said thoriated tungsten bodies are intended to be used. The optimum value of the carbon content indicated by the beginning of the appearance of the thorium globules detailed above usually is in the order of magnitude of a few hundredths of percent by weight, also depending on various factors.

It is to be understood and obvious to those skilled in this art, that various changes and modifications may be effected in carrying out the present invention without departing from the spirit and scope thereof and therefore the aim in the appended claims is to cover all such changes and modifications as fall within the true spirit and scope of this invention.

What we claim is:
1. A method of producing thoriated metallic tungsten wires and other bodies from tungsten powder containing thorium dioxide, by pressing, sintering, swaging and drawing, comprising in combination the steps of alternately exposing a tungsten body obtained by pressing and sintering from tungsten powder containing more than 1% and up to 4% by weight of thorium dioxide, to repeated contacts with a carbon-containing material at temperatures in the range of 1450°–1600° C., and to repeated workings, in order to improve workability of said bodies.

2. A method as claimed in claim 1, in which contact with the carbon-containing material is carried out in a current of protective gas.

3. A method as claimed in claim 1, in which the sintered tungsten body is heated in a carbon-containing tube.

4. A method as claimed in claim 1, in which the tungsten bodies are brought in contact with the carbon-containing body prior to as well as during swaging.

5. A method as claimed in claim 2, in which the sintered tungsten body is heated in a ceramic tube.

6. A method as claimed in claim 2, in which the protective gas consists of a mixture of hydrogen and illuminating gas.

7. A method of producing thoriated metallic tungsten wires and other bodies from tungsten powder containing more than 1% and up to 4% by weight of thorium dioxide, by pressing, sintering, swaging and drawing, comprising the step of exposing sintered tungsten bodies, during their working, temporarily at elevated temperature to repeated contact with a carbon-containing material and incorporating carbon in the sintered tungsten bodies by such contact at temperatures in the range of 1450°–1600° C., in order to improve workability of said bodies; said heating of the tungsten bodies in contact with carbon being carried out in the current of a protective gas; the temperature and period of heating in contact with carbon, and the velocity of the protective gas current being adjusted in such a manner that after termination of said heating period, upon heating the treated tungsten bodies, after diminution of the diameter of the body by about 30% by swaging, to a temperature of at least 2000° C. in a hydrogen atmosphere, tiny globules of metallic thorium just begin to appear on the surface of the tungsten bodies.

References Cited in the file of this patent
UNITED STATES PATENTS
1,663,547    Gero _____ Mar. 27, 1928

OTHER REFERENCES
"Tungsten," by Smithells, 3rd edition, Chapman & Hall Ltd., 1952, page 218.